United States Patent
Becker

(10) Patent No.: US 7,784,744 B2
(45) Date of Patent: Aug. 31, 2010

(54) CLAMP FOR INTERCONNECTING ORTHOGONALLY ORIENTED PIPES

(76) Inventor: Renae E. Becker, 31915 Trail Rd., Agua Dulce, CA (US) 91390

( * ) Notice: Subject to any disclaimer, the term of this patent is extended or adjusted under 35 U.S.C. 154(b) by 0 days.

(21) Appl. No.: 12/001,944

(22) Filed: Dec. 11, 2007

(65) Prior Publication Data

US 2009/0146021 A1    Jun. 11, 2009

(51) Int. Cl.
*F16L 3/22*       (2006.01)
(52) U.S. Cl. .................. 248/68.1; 248/74.4; 248/218.4
(58) Field of Classification Search ............... 248/68.1, 248/74.1, 74.4, 218.4, 230.1, 229.16, 229.1
See application file for complete search history.

(56) References Cited

U.S. PATENT DOCUMENTS

| | | | |
|---|---|---|---|
| 3,157,388 A | 11/1964 | Nelson | |
| 3,486,739 A | 12/1969 | Nelson et al. | |
| 3,520,564 A | 7/1970 | Peterson | |
| 3,524,627 A | 8/1970 | Boyanton et al. | |
| 3,604,687 A | 9/1971 | Moore | |
| 4,208,038 A | 6/1980 | Reid | |
| 4,549,634 A | 10/1985 | Duncan et al. | |
| 4,819,582 A | 4/1989 | Lichvar | |
| 4,841,708 A | 6/1989 | Johnston | |
| 5,181,684 A * | 1/1993 | Sager | 248/231.61 |
| 5,454,662 A | 10/1995 | Skibitzke et al. | |
| 5,593,143 A * | 1/1997 | Ferrarin | 256/68 |
| 5,697,129 A * | 12/1997 | Newville | 24/339 |
| 6,386,519 B1 | 5/2002 | Priefert | |
| 6,491,294 B1 | 12/2002 | Hyatt | |
| 6,688,046 B2 | 2/2004 | Perkins | |
| 6,883,761 B2 * | 4/2005 | Boon et al. | 248/74.1 |
| 7,293,745 B2 * | 11/2007 | Catapano | 248/61 |
| D576,870 S * | 9/2008 | Eason et al. | D8/396 |

* cited by examiner

*Primary Examiner*—J. Allen Shriver, II
*Assistant Examiner*—Steven M Marsh
(74) *Attorney, Agent, or Firm*—Koppel, Patrick, Heybl & Dawson; Michael J. Ram

(57) ABSTRACT

A clamp for connecting a pair of orthogonally disposed pipes. The clamp may comprise a pair of identical clamp halves or brackets, or a pair of mirror-image clamp halves or brackets, each bracket having a centrally located plate portion having one or more apertures, an upper surface, a lower surface and spaced apart ends, each of the ends carrying a curved jaw designed to conform to cylindrical outer surfaces of the pipes. The lower surfaces of the plate portions of the pair of clamp brackets are disposed in confronting relationship with their apertures in alignment, the pair of brackets being coupled with one or more fasteners passing through the aligned apertures. The end jaws of one of the brackets are in opposed relationship with the corresponding end jaws of the other of the brackets, wherein the end jaws of the coupled brackets define a pair of generally cylindrical pipe gripping surfaces each having a longitudinal central axis. The orientation of the jaws relative to their respective plate portions is such that the longitudinal central axis of one of the pair of generally cylindrical pipe gripping surfaces is orthogonal to the longitudinal central axis of the other of the pair of generally cylindrical pipe gripping surfaces.

9 Claims, 3 Drawing Sheets

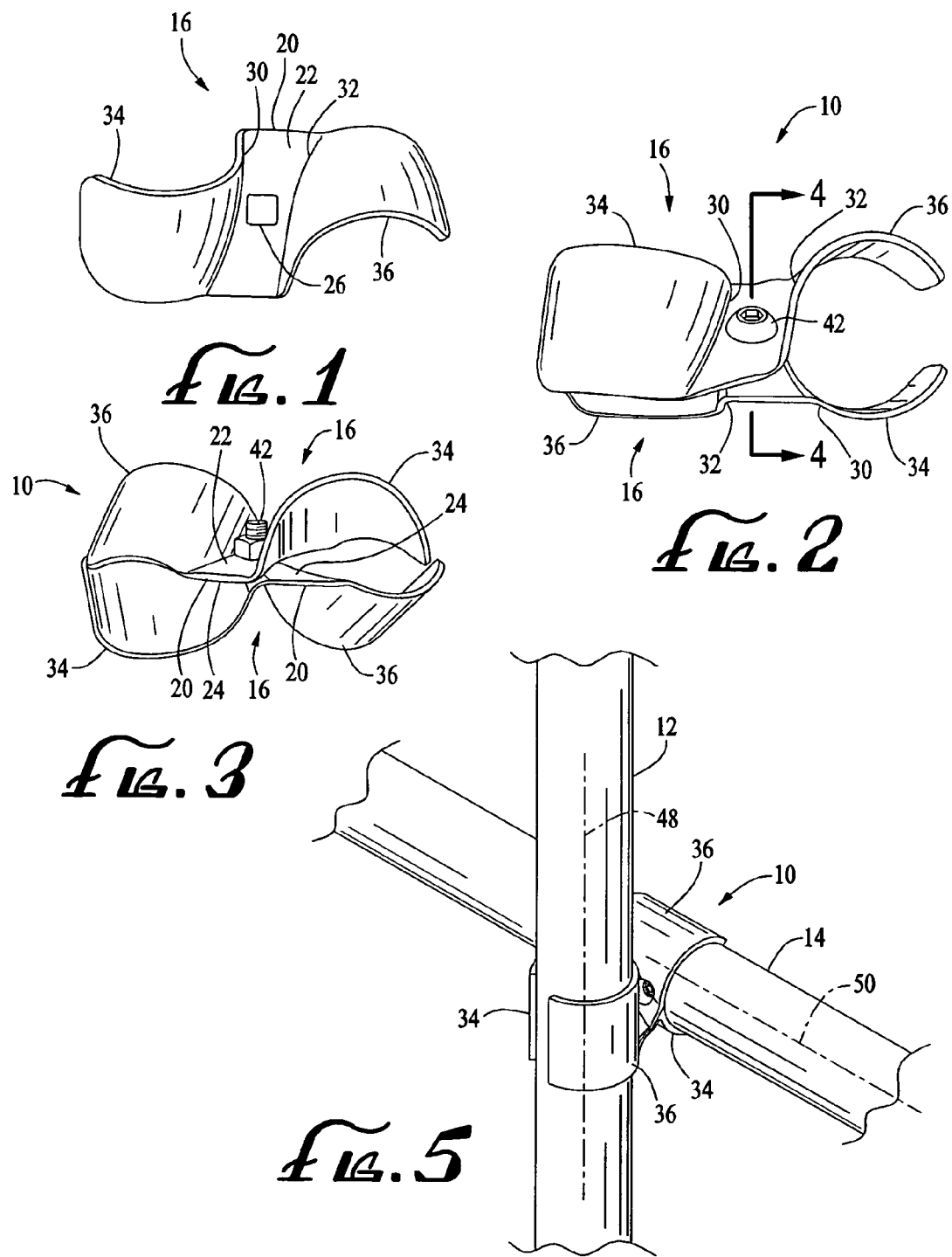

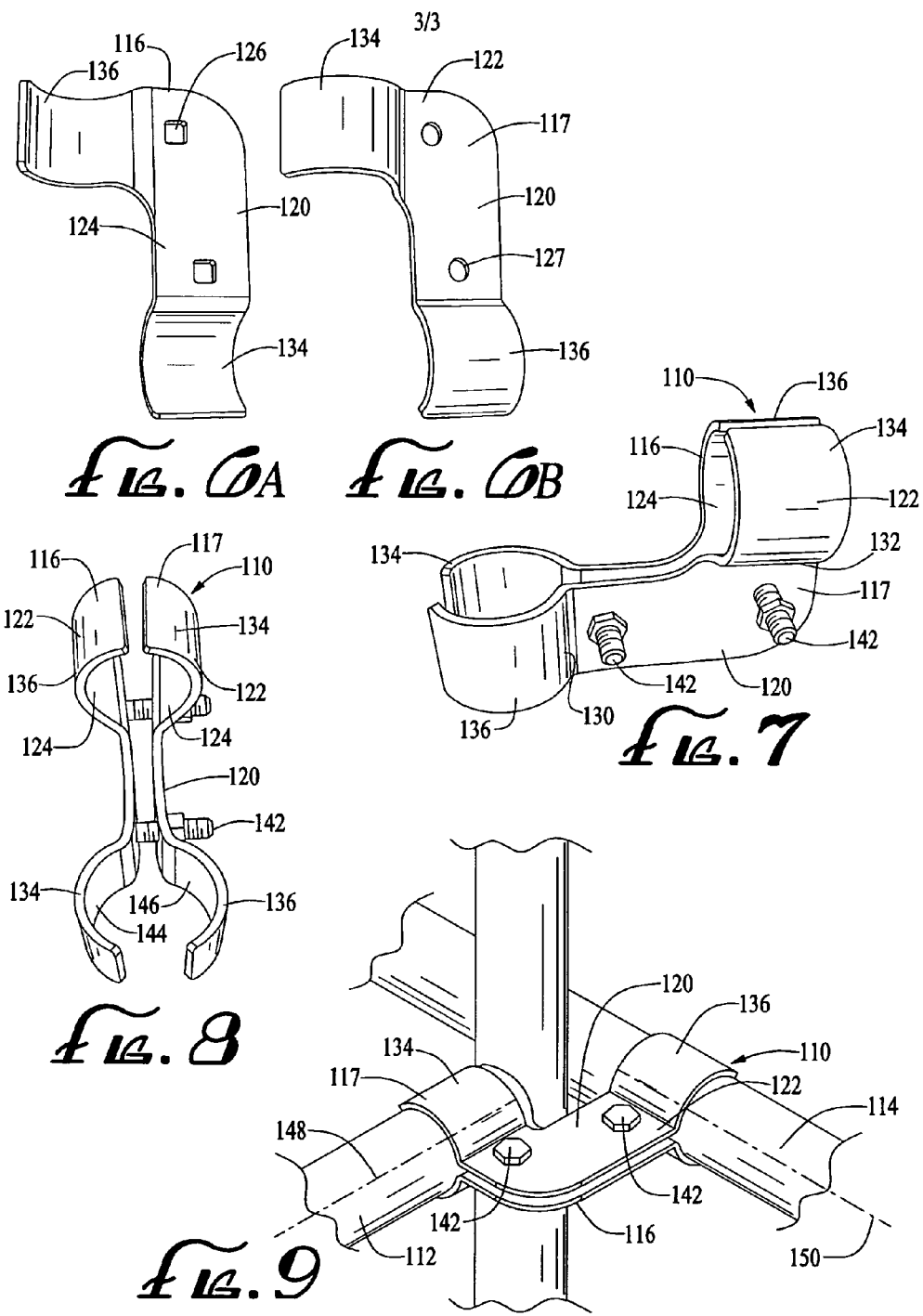

CLAMP FOR INTERCONNECTING ORTHOGONALLY ORIENTED PIPES

FIELD OF THE INVENTION

This invention relates generally to clamps and particularly to a clamp for coupling a pair of orthogonally oriented pipes such as may be found in fencing such as a livestock corral or other enclosure.

BACKGROUND OF THE INVENTION

Existing pipe frame or panel structures for fencing, livestock enclosures and the like often incorporate clamping devices for interconnecting two pipes that are disposed parallel to each. Also, clamping devices for interconnecting pipes at right angles relative to each other are available but tend to be relatively complex and costly. Still other, known pipe interconnection devices require special tools and/or skilled labor such as welders.

SUMMARY OF THE INVENTION

The present invention provides simple, low cost clamps for securely interconnecting a pair of crossing pipes, usually of equal diameters, using a single, commercially available fastener. A first embodiment is intended to clamp orthogonal pipes in the same plane, for example both parallel to the ground; the second embodiment is intended to clamp orthogonal pipes also located in the same plane but in a different orientation, for example one pipe parallel to the ground and the second pipe perpendicular to the ground. In the first instance, the clamp comprises identical, interchangeable, clamp halves or brackets eliminating the need to carry separate inventories of each clamp component. In the second instance, the clamp comprises mirror image clamp halves or brackets. The clamps of the invention allow the rapid assembly and disassembly of any built-up pipe structure that has orthogonally crossed pipes, for example, fencing or livestock enclosures such as horse corrals, using ordinary tools and without the need for skilled labor. The ends of the fasteners used to assemble the paired halves of the bracket are shielded by portions of the clamp brackets reducing the likelihood of injury to livestock or personnel once mounted to the pipes.

In accordance with one specific, exemplary embodiment of the invention, there is provided a clamp for connecting a pair of orthogonally crossed pipes in the region of their crossing, the crossed pipes preferably having the same outer diameter at least in the region of their crossing. The clamp comprises a pair of identical clamp brackets, each bracket comprising a centrally apertured plate portion having an upper surface, a lower surface and spaced apart ends, each of the ends carrying a curved jaw rounded to conform to approximately one-half of the circumference of the outer surface of the pipes. The lower surfaces of the plate portions of the pair of clamp brackets are disposed in confronting relationship with their apertures in alignment, the pair of brackets being coupled with a single fastener passing through the aligned apertures. The curved jaws on the ends of one of the brackets is in opposed relationship with the corresponding curved jaws of the other of the brackets, so that the end jaws define a pair of generally cylindrical pipe gripping surfaces each having a longitudinal central axis. The orientation of the jaws relative to their respective plate portions is such that the longitudinal central axis of one of the pair of generally cylindrical pipe gripping surfaces is orthogonal to the longitudinal central axis of the other of the pair of generally cylindrical pipe gripping surfaces but at a 45° angle to the lower surface of the plate portions. A primary application of this embodiment is for securing a first pipe parallel to the ground to a second pipe perpendicular to the ground. However it can be used to secure two pipes both parallel to the ground. In each instance both pipes are in a different plane.

In accordance with a second specific, exemplary embodiment of the invention, there is provided a clamp for connecting a pair of orthogonally crossed pipes in the region of their crossing. In its preferred orientation, while the two pipes are either both parallel to the ground or one pipe is parallel to the ground and the second is perpendicular to the ground, both pipes are in the same plane. The clamp comprises a pair of mirror image clamp brackets, each bracket comprising a plate portion with one or more openings there through, an upper and lower surface, and spaced apart ends, each of the ends carrying a curved jaw rounded to conform to approximately one-half of the circumference of the outer surface of the pipes. The lower surfaces of the plate portions of the pair of clamp brackets are disposed in confronting relationship with their one or more apertures in alignment, the pair of brackets being coupled with one or more fasteners passing through the aligned apertures. The curved jaws on the ends of one of the brackets is in opposed relationship with the corresponding curved jaws of the other of the brackets, so that the end jaws define a pair of generally cylindrical pipe gripping surfaces each having a longitudinal central axis. The orientation of the jaws relative to their respective plate portions is such that the longitudinal central axis of one of the pair of generally cylindrical pipe gripping surfaces is orthogonal to the longitudinal central axis of the other of the pair of generally cylindrical pipe gripping surfaces but in the same plane as the lower surfaces of the plate portion.

In one aspect of the invention the fastener has ends projecting from the upper surfaces of the plate portions and the ends of each fastener projects a distance from the upper surface of the associated plate portion a distance less than the height of the jaws above the upper surface of the plate.

The fastener may comprise a threaded bolt and nut.

In accordance with yet another aspect of the invention, each of the clamp brackets preferably comprises a unitary, one-piece, sheet metal structure bent into the appropriate shape. Alternatively, the jaws may be welded to the ends of the associated plate portion. Still further, the clamp brackets may comprise cast metal or a suitably molded or formed structural plastic or composite material.

BRIEF DESCRIPTION OF THE DRAWINGS

Further objects, features and advantages of the invention will become apparent from the detailed description, below, when read in conjunction with the accompanying drawings in which:

FIG. 1 is a top plan view of one half of a clamp in accordance with one specific, exemplary embodiment of the invention;

FIGS. 2 and 3 are perspective views of an assembled clamp in accordance with the present invention;

FIG. 5 is a perspective view of a pair of pipes in the region of their crossing, the pipes being coupled by the embodiment of the clamp of the invention shown in FIGS. 2 and 3;

FIGS. 6a and 6b are plan views of the clamp halves in accordance with an alternative embodiment of the invention;

FIGS. 7 and 8 are perspective views of an assembled clamp, the clamp comprising two clamp halves of FIGS. 6a and 6b joined by fastener means;

FIG. 9 is a perspective view of portions of pipe frames or panels joined by a clamp as shown in FIGS. 6, 7 and 8.

DETAILED DESCRIPTION

Figure 4:
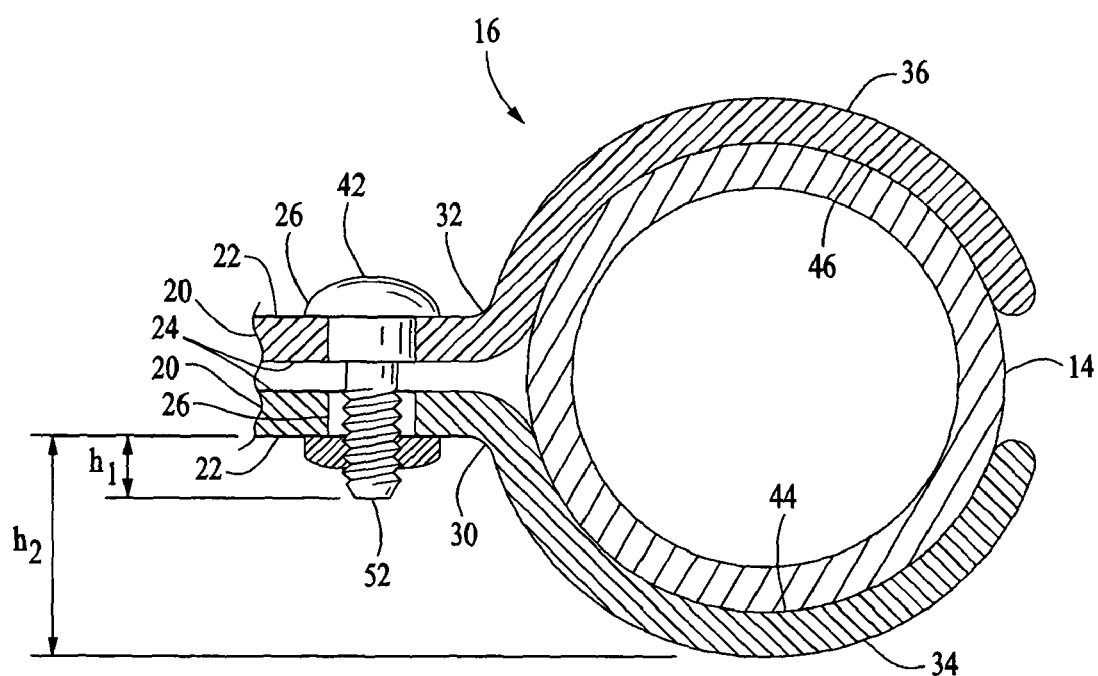
FIG. 4 is a transverse cross section view of the assembled clamp of FIG. 2, as seen along the line 4-4 in FIG. 2.

The following description is of a first mode presently contemplated for practicing the invention. This description is not to be taken in a limiting sense but is made merely for the purpose of describing the general principles of the invention whose scope may be ascertained by referring to the appended claims.

The terms "pipe" and "pipes" are used herein in a comprehensive sense, being intended to include, without limitation, posts (typically vertically oriented), rails (typically running transversely or horizontally), tubes, and other pipe-like members that in various assembled structures such as fences and livestock enclosures often cross over or are otherwise disposed at right angles relative to each other.

The interconnected pipes may form part of a frame or panel that may, in turn, comprise part of a fence such as a chain link fence or a livestock enclosure such as a horse corral in which vertical posts are interconnected with transverse or horizontal rails where the posts and rails are pipe-like members. Although such fence, enclosure or other structure may comprise a permanent structure, because the clamp of the invention facilitates decoupling of the crossed, interconnected pipes the structure accordingly may comprise a portable, knock down unit that may be easily disassembled and reassembled.

Although the pipes would in most cases be formed of a corrosion-resistant metal such as galvanized steel, the clamp of the invention may be used to couple pipes of any material that provides adequate strength and rigidity for a given application, including a polymeric material such as PVC tubing or wooden fence components. It will be further evident that the clamp of the invention may be used to interconnect pipes having a wide range of nominal diameters including by way of non-limiting examples, ¾ inch, 1 inch, 1¼ inch and 1½ inch.

Referring to the FIGS. 1-5 of the drawings, there is shown a clamp 10 in accordance with a first, specific, exemplary embodiment of the invention. In the particular embodiment depicted, the clamp 10 is adapted to interconnect a pair of orthogonally crossed pipes 12 and 14 (FIG. 5) in the region of their crossing, the crossed pipes having the same outer diameter at least in the crossing region. In the illustrative embodiment shown, the first pipe 12 comprises a vertical post and the second pipe 14 comprises a horizontal rail.

The clamp 10 comprises a pair of identical clamp brackets 16 in confronting relationship. Each clamp bracket 16 comprises a central plate portion 20 having opposed upper and lower surfaces 22, 24, respectively, and a generally centrally positioned through-aperture 26, preferably a square aperture. The plate portion 20 further comprises spaced apart ends or junctions 30, 32 carrying curved jaws 34, 36, respectively, conforming in shape to a portion of the outer surface of the associated pipes. The curved portion of the jaws 34, 36 is generally semicircular in shape to conform to a portion of the surface of the cylindrically shaped pipe. Each clamp bracket 16 is preferably a unitary part, for example, a single piece of galvanized sheet steel having a thickness of, for example, 5/32 inch and formed by a power press that urges the metal against and about a mold. The jaws 34, 36 are thus joined to or integral with the plate portion 20 along the junctions 30, 32. Alternatively, the jaws and plate portions may be fabricated as separate parts and joined by welding the jaws to the ends of the plate portion along the junctions 30 and 32.

The lower surfaces 24 of the plate portions 20 of the clamp brackets are disposed in confronting relationship with the apertures 26 in alignment. The pair of brackets 16 is preferably coupled together using a single fastener 42 passing through the aligned apertures. The fastener 42 preferably comprises a commercially available, standard carriage bolt and mating nut, the square neck of the bolt being received by the square aperture 26 in one of the plate portions in well known fashion with the nut engaging the upper surface 22 of the other plate portion 20. By way of example, the threaded fastener may have a threaded shank 5/16-inch in diameter. Alternatively, the fastener may comprise a hex head/nut fastener, an Allen head bolt and mating nut, or any other one of the myriad kinds of standard, low cost threaded fasteners available now or that may become available in the future. A less preferred construction would include a threaded aperture in at least one of the mated brackets and a compatible threaded connector which passes through the aperture in the other bracket and mates with the threaded aperture.

With the brackets 16 joined together as shown in FIGS. 2-5, the curved end jaw 34 of one of the brackets is in opposed relationship with the corresponding curved end jaw 36 of the other of the brackets, the end jaws 34, 36 thus defining a pair of generally cylindrical pipe gripping surfaces 44, 46. The cylindrical pipe gripping surfaces 44, 46 have longitudinal central axes 48, 50, respectively, the orientation of the jaws relative to their respective plate portions being such that the longitudinal central axis of one of the pair of generally cylindrical pipe gripping surfaces is generally orthogonal to the longitudinal central axis of the other of the pair of generally cylindrical pipe gripping surfaces and at a 45° angle to the plate 20 upper surface 22. Tightening of the fastener 42 draws together the opposed pipe gripping surfaces 44, 46 so that these surfaces securely grip the pipes 12 and 14 and rigidly maintain the pipes in orthogonal relationship. It will be evident that neither special tools nor skilled labor are required to tighten or loosen the fastener.

With reference to FIG. 4, in a preferred configuration, the threaded end 52 of the fastener projects a distance h1 from the upper surface 22 of the corresponding plate portion 20, which distance is less than the height h2 of the corresponding jaw above the upper surface. The head of the fastener projects even a shorter distance above the opposite upper surface 22. Accordingly, each of the opposite ends of the screw fastener 42 is shielded by its associated jaws 34, 36 tending to protect animals and personnel from injury. However, the assembly disclosed herein is not intended to be limited to this special relationship and longer fasteners can be used to assemble the clamp.

Referring to the FIGS. 6-9 of the drawings, there is shown a clamp 110 in accordance with a second, specific, exemplary embodiment of the invention. In the particular embodiment depicted, the clamp 110 is adapted to interconnect a pair of orthogonally crossed pipes 112, 114 (FIG. 9) in the region of their crossing, the crossed pipes having the same outer diameter at least in the crossing region. In the illustrative embodiment shown, the pipes 112, 114 both comprise a horizontal rails.

The clamp 110 comprises a pair of mirror-image clamp brackets 116, 117 in confronting relationship. Each clamp bracket 116, 117 comprises a central plate portion 120 having opposed upper and lower surfaces 122, 124, respectively, and a one or more through-apertures 126, preferably square. Alternatively, the apertures in one of the plates can be other than square such as the round aperture 127 shown in FIG. 6b. The plate portion 120 further comprises spaced apart ends or junctions 130, 132 carrying generally semicircular curved jaws 134, 136, respectively, conforming to the outer surface of the associated pipes 112, 114. Each clamp bracket 116, 117 is preferably a unitary part, for example, a single piece of galvanized sheet steel having a thickness of, for example, 5/32 inch and formed by a power press that urges the metal against and about a mold. The jaws 134, 136 are thus joined to the plate portion 120 along the junctions 130, 132. Alternatively, the jaws and plate portions may be fabricated as separate parts and joined by welding the jaws to the ends of the plate portion along the junctions 130 and 132 or they formed from or molded from suitable plastic or composite materials.

The lower surfaces 124 of the plate portions 120 of the clamp brackets 116, 117 are disposed in confronting relationship with the apertures 126 in alignment. The pair of brackets 116 are coupled together with a one or more fasteners 142 passing through the aligned apertures. The fastener 142 preferably comprises a commercially available, standard carriage bolt and mating nut, the square neck of the bolt being received by the square aperture 126 in one of the plate portions 120 in well known fashion with the nut engaging the upper surface 122 of the other plate portion 120. By way of example, the threaded fastener may have a threaded shank 5/16-inch in diameter. Alternatively, the fastener may comprise a hex head/nut fastener, an Allen head bolt and mating nut, or any other one of the myriad kinds of standard, low cost threaded fasteners available now or that may become available in the future.

With the brackets 116, 117 joined together as shown in FIGS. 7-9, the curved end jaw 134 of one of the brackets is in opposed relationship with the corresponding curved end jaw 136 of the other of the brackets, the end jaws 134, 136 thus defining a pair of generally cylindrical pipe gripping surfaces 144, 146. The cylindrical pipe gripping surfaces 144, 146 have longitudinal central axes 148 and 150, respectively, the orientation of the jaws relative to their respective plate portions being such that the longitudinal central axis of one of the pair of generally cylindrical pipe gripping surfaces is generally orthogonal to the longitudinal central axis of the other of the pair of generally cylindrical pipe gripping surfaces and generally in the plane of the lower surfaces 124 of the plates 120. Tightening of the fastener 142 draws together the opposed pipe gripping surfaces 144, 146 so that these surfaces securely grip the pipes 112, 114 and rigidly maintain the pipes in orthogonal relationship. It will be evident that neither special tools nor skilled labor are required to tighten or loosen the fastener.

While an illustrative embodiment of the invention has been disclosed herein, still further variations and alternative embodiments will occur to those skilled in the art. Such variations and alternative embodiments are contemplated, and can be made without departing from the spirit and scope of the invention as defined in the appended claims.

I claim:

1. A clamp for connecting a pair of orthogonally disposed pipes of a pipe enclosure, said pipes having the same outer diameter, the clamp comprising:
   a pair of identical clamp halves, each clamp half comprising an integral structure including a central, flat portion having an upper surface and a lower surface and at least one aperture through said flat portion, a first jaw curved to conform to the cylindrical outer surface of a pipe and extending longitudinally from a first end of the central flat portion along a first junction, a second jaw curved to conform to the cylindrical outer surface of a pipe and extending longitudinally from a second end of the central flat portion along a second junction spaced longitudinally apart from said first junction, the clamp halves being coupled together with fastener means passing through the at least one aperture in said halves with the lower surfaces of the respective flat portions in confronting relationship to place the first jaw of one of the clamp halves in opposition to the second jaw of the other of said clamp halves to define a pair of generally cylindrical pipe gripping surfaces each having a longitudinal central axis, the orientation of said jaws relative to their respective flat portions being such that the longitudinal central axis of one of said pair of generally cylindrical pipe gripping surfaces is orthogonal to the longitudinal central axis of the other of said pair of generally cylindrical pipe gripping surfaces, each longitudinal central axis being at a 45° angle to a plane through the central flat portion, said fastener means in its assembled state being operable to urge the clamp halves together to securely clamp the crossed pipes in orthogonal relationship.

2. The clamp of claim 1 wherein:
the pair of pipes comprise a post and a rail.

3. The clamp of claim 1 wherein:
the pair of pipes comprise a first rail and a second rail.

4. The clamp of claim 1 wherein:
the fastener means comprise one fastener and each bracket has one aperture.

5. The clamp of claim 1 wherein:
the fastener means has ends projecting from the upper surfaces of the central portions, and wherein in the assembled, tightened state of the clamp, the fastener means ends project a distance from the associated upper surface that is less than the height of the jaws whereby the fastener ends are shielded by the jaws.

6. The clamp of claim 1 wherein:
said fastener means comprises a threaded bolt and nut.

7. The clamp of claim 1 wherein:
said fastener means comprises a carriage bolt and nut.

8. The clamp of claim 1 wherein:
each of the clamp halves comprises a unitary, one-piece structure formed from sheet metal, a polymeric material or a composite material.

9. The clamp of claim 1 wherein:
the junctions between the respective jaws of each clamp half and the associated central flat portion comprise welded joints.

* * * * *